(12) United States Patent
Valadez et al.

(10) Patent No.: US 8,351,673 B2
(45) Date of Patent: Jan. 8, 2013

(54) COORDINATED DESCRIPTION IN IMAGE ANALYSIS

(75) Inventors: Gerardo Hermosillo Valadez, West Chester, PA (US); Bing Jian, Exton, PA (US); Yoshihisa Shinagawa, Downingtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 692 days.

(21) Appl. No.: 12/549,375

(22) Filed: Aug. 28, 2009

(65) Prior Publication Data

US 2010/0111391 A1      May 6, 2010

Related U.S. Application Data

(60) Provisional application No. 61/109,636, filed on Oct. 30, 2008.

(51) Int. Cl.
*A61B 6/03*      (2006.01)
(52) U.S. Cl. .......................................... 382/132; 706/12
(58) Field of Classification Search .......... 382/128–132; 706/12–13
See application file for complete search history.

(56) References Cited

U.S. PATENT DOCUMENTS
2010/0063947 A1* 3/2010 Burnside et al. ................ 706/12

OTHER PUBLICATIONS

Pan et al., The effects of training parameters on learning a probabilistic expert system for mammography, 2004, International Congress Series, CARS 2004, pp. 1027-1032.*
American College of Radiology, BI-RADS—MRI, 2003, First edition, First 5 pages. Available at http://www.acr.org/Quality-Safety/Resources/BIRADS/MRI.*
Burnside, Bayesian Networks: Computer-assisted Diagnosis Support in Radiology, 2005, Academic Radiology, vol. 12, pp. 422-430.*
Burnside et al., A Bayesian network for mammography, 2000, Proc. AMIA Symp., pp. 106-110.*
Ruth M. L. Warren et al., Evaluation of a Prospective Scoring System Designed for a Multicenter Breast MR Imaging Screening Study, Radiology, Jun. 2006, pp. 677-685, vol. 239, No. 3, RSNA.
Eugene Charniak, Bayesian Networks without Tears, The American Association for Artificial Intelligence, 1991, pp. 50-63 (excluding cover page), AAAI.
Debra M. Ikeda et al., Development, Standardization, and Testing of a Lexicon for Reporting Contrast-Enhanced Breast Magnetic Resonance Imaging Studies, Journal of Magnetic Resonance Imaging, 2001, pp. 889-895, vol. 13, Wiley-Liss, Inc.

* cited by examiner

*Primary Examiner* — Toan Ton
*Assistant Examiner* — John Corbett
(74) *Attorney, Agent, or Firm* — Peter Withstandley

(57) ABSTRACT

Described herein is a technology for facilitating coordinated description in image analysis. In one implementation, the technology includes receiving image data including at least first and second descriptors (204) describing portions of the image data. The first and second descriptors are coordinated by determining at least one conditional probability of observing the first descriptor in the image data given an occurrence of the second descriptor (206). A classifier may then be trained based on the conditional probability (208).

20 Claims, 4 Drawing Sheets

COORDINATED DESCRIPTION IN IMAGE ANALYSIS

CROSS-REFERENCE TO RELATED APPLICATION

The present application claims the benefit of U.S. provisional application No. 61/109,636 filed Oct. 30, 2008, the entire contents of which are herein incorporated by reference.

TECHNICAL FIELD

The present disclosure relates generally to analyzing images, and more particularly to coordinated description in image analysis.

BACKGROUND

Various imaging systems and tools have been developed to assist physicians, clinicians, radiologists, etc. in evaluating medical images to diagnose medical conditions. For example, computer-aided detection (CAD) tools have been developed for various clinical applications to provide automated detection of abnormalities in medical images, such as colonic polyps and other abnormal anatomical structures such as lung nodules, lesions, aneurysms, calcification, in breast, heart or artery tissue, etc.

A common medical imaging technique is magnetic resonance imaging (MRI), which uses a powerful magnetic field to image the internal structure and certain functionality of a body. MRI is particularly suited for imaging soft tissue structures and is thus highly useful in the field of oncology for the detection of breast lesions. Variations in breast MRI techniques and descriptions of morphologic findings, however, often give rise to difficulties among radiologists in describing lesions and communicating the results to physicians for diagnosis and treatment.

To overcome difficulties arising from the lack of standardization, the American College of Radiology developed the BI-RADS-MRI lexicon, published as a part of the American College of Radiology's Breast Imaging Reporting and Data System Atlas. For ease of comparison and reference, it is often recommended that radiologists use the BI-RADS lexicon, in addition to kinetic time-intensity information, to describe the morphology of lesions during clinical analysis of breast MRI.

According to the BI-RADS lexicon, a lesion may be classified according to various morphologic categories. For example, a lesion may be categorized according to its shape (round, oval, lobulated or irregular) or margin (smooth, irregular or speculated). Morphology provides useful clues in identifying whether the lesion is malignant or not. A lesion is more likely to be malignant if it has an irregular shape while a round lesion is more likely benign. A lesion with a speculated margin or rim enhancement is more suspicious than a lesion with dark septations or a lesion with homogenous interior brightness.

One problem with prior techniques arises because each category is evaluated independent of the other categories. Such evaluation often gives rise to self-contradictory descriptions. For example, a lesion may be clinically classified as having both a round shape and a speculated margin. Such classification seems contradictory as a round mass is connotative of benignity, while a speculated margin is connotative of malignancy. Similarly, a descriptor indicating that a lesion has both dark septations and rim enhancement sounds self-contradictory. This may cause confusion during the interpretation of MRI findings, resulting in significant degradation in detection and diagnostic performance.

Therefore, there is a need for a technology that mitigates or obviates the foregoing problems.

SUMMARY

A technology for facilitating coordinated description in image analysis is described herein. Image data, including at least first and second descriptors describing portions of one or more images, is received. The first and second descriptors may be selected from a standard set of descriptors based on a classification system, such as the BI-RADS lexicon. The descriptors are coordinated by determining at least one conditional probability of observing the first descriptor in the image data given an occurrence of the second descriptor.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present systems and methods and in order to meet statutory written description, enablement, and best-mode requirements. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present systems and methods. Furthermore, for ease of understanding, certain method steps are delineated as separate steps; however, these separately delineated steps should not be construed as necessarily order dependent in their performance.

The following description sets forth one or more implementations of systems and methods that facilitate image analysis. One implementation of the present framework coordinates descriptors of image data (e.g., BI-RADS descriptors) using conditional probabilities that relate one descriptor to another. Such coordination advantageously avoids the use of contradictory descriptors that causes confusion amongst medical practitioners during evaluation of MRI findings. The conditional probabilities may be used to, for example, train a classifier for use in computer-aided detection applications.

It is noted that, while a particular application directed to analysis of lesions in breast MRI is shown, the technology is not limited to the specific embodiment illustrated. The present technology has application to, for example, other types of images obtained by other imaging techniques (e.g., computed tomographic (CT), helical CT, x-ray, positron emission tomographic, fluoroscopic, ultrasound and single photon emission computed tomographic (SPECT)), and of other types of anatomical features, such as the lung, prostate, kidney, liver or brain.

Figure 1:
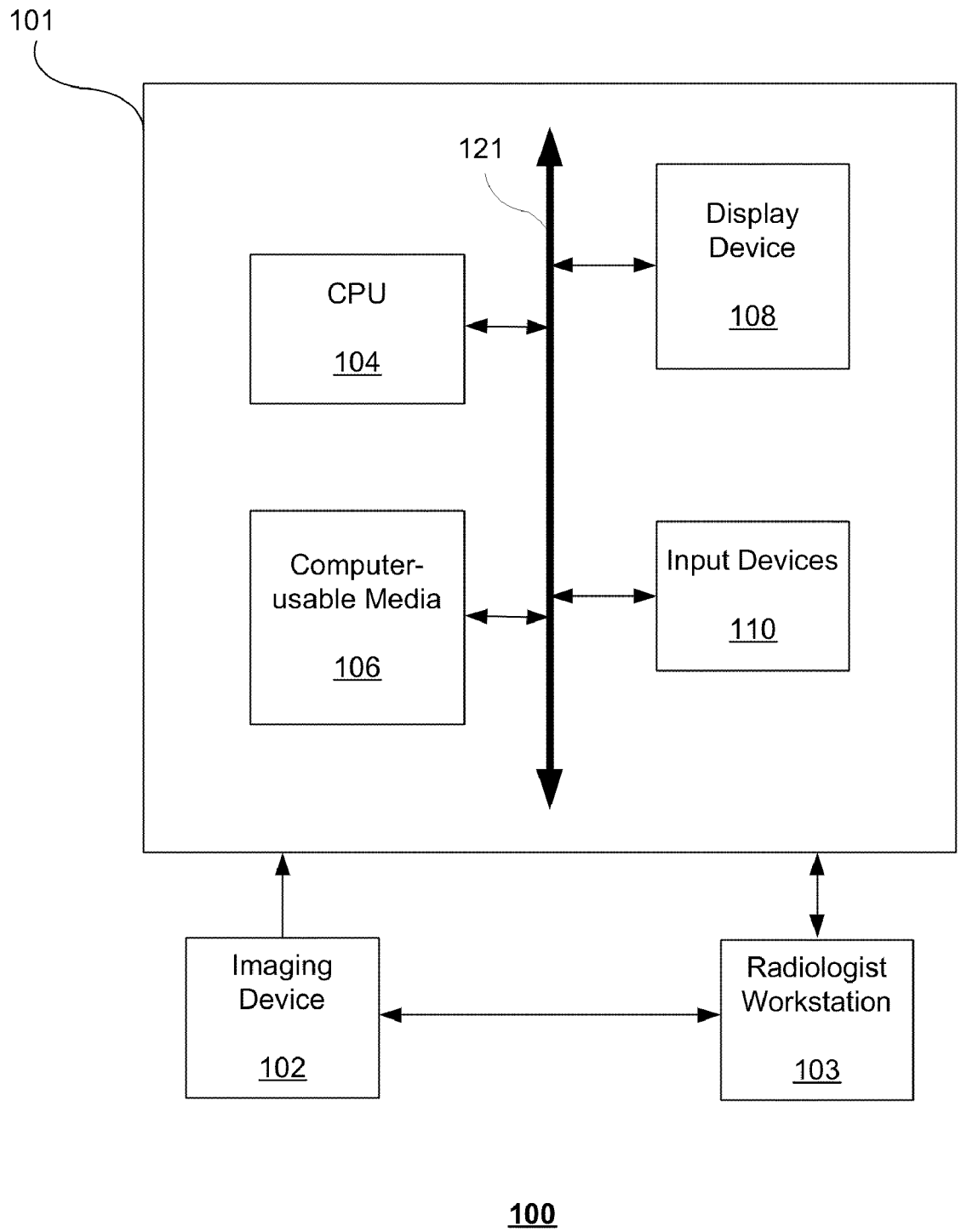
FIG. 1 shows a block diagram of an exemplary CAD system.

FIG. 1 shows a block diagram illustrating an exemplary CAD system 100. The CAD system 100 includes a computer system 101 for implementing the framework as described herein. The computer system 101 may be further connected to an imaging device 102 and a radiologist workstation 103, over a wired or wireless network. The imaging device 102 may be a radiology scanner such as a MR scanner or a CT scanner.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more computer-usable media 106 (e.g., computer storage or memory), display device 108 (e.g., monitor) and various input devices 110 (e.g., mouse or keyboard) via an input-output interface 121. Computer system 101 may further include support circuits such as a cache, power supply, clock circuits and a communications bus.

It is to be understood that the present technology may be implemented in various forms of hardware, software, firmware, special purpose processors, or a combination thereof. In one implementation, the techniques described herein may be implemented as computer-readable program code tangibly embodied in computer-usable media 106. Computer-usable media 106 may include random access memory (RAM), read only memory (ROM), magnetic floppy disk, flash memory, and other types of memories, or a combination thereof. The computer-readable program code may be executed by CPU 104 to process images (e.g., MR or CT images) from the imaging device 102 (e.g., MR or CT scanner). As such, the computer system 101 is a general-purpose computer system that becomes a specific purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein.

Computer system 101 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 101.

The radiologist workstation 103 may include a computer and appropriate peripherals, such as a keyboard and display, and can be operated in conjunction with the entire CAD system 100. For example, the radiologist workstation 103 may communicate with the imaging device 102 so that the image data collected by the imaging device 102 can be rendered at the radiologist workstation 103 and viewed on the display. The radiologist workstation 103 may include a user interface that allows the radiologist or any other skilled user (e.g., physician, technician, operator) to manipulate the image data. For example, the radiologist may identify regions of interest in the image data, or annotate the regions of interest using pre-defined descriptors via the user-interface. Further, the radiologist workstation 103 may communicate directly with the computer system 101 to access and display previously processed image data so that a radiologist can manually verify the results of the present framework.

Figure 2:
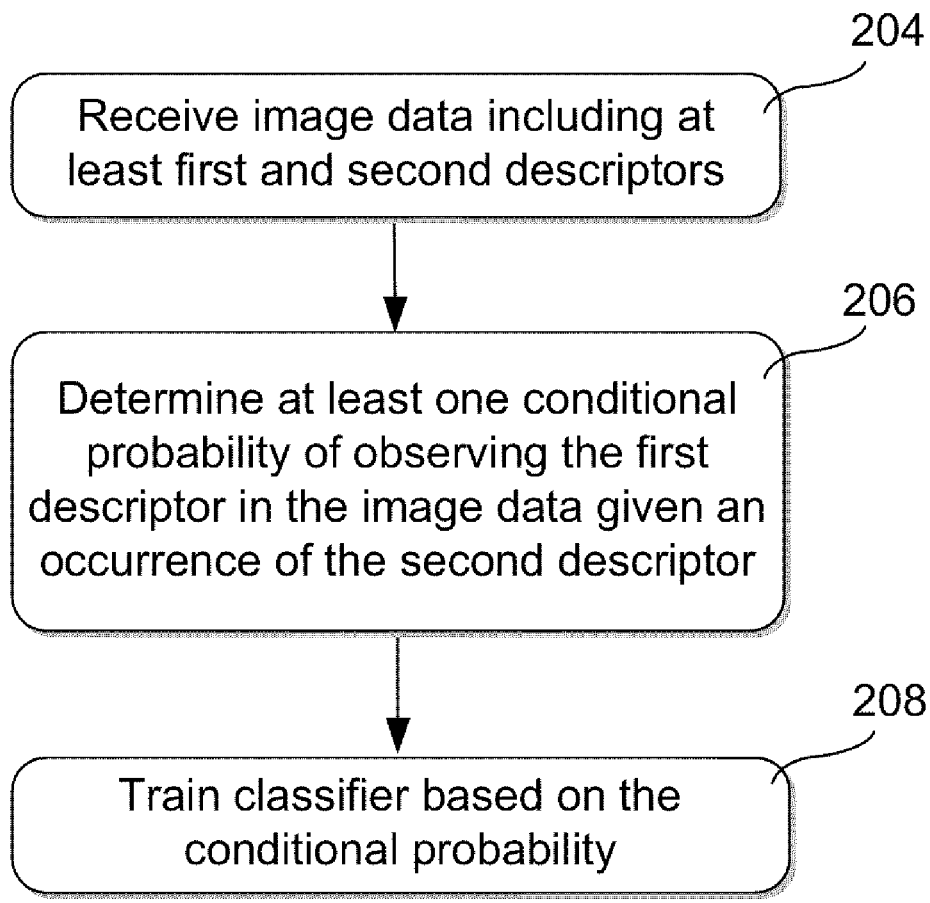
FIG. 2 shows an exemplary method which may be implemented by the exemplary CAD system.

FIG. 2 shows an exemplary method 200 which may be implemented by the CAD system 100. In the discussion of FIG. 2 and subsequent figures, continuing reference may be made to elements and reference numerals shown in FIG. 1.

At step 204, the computer system 101 receives image data. The image data may include one or more images acquired by, for example, imaging device 102. The imaging device 102 may acquire the images by at least one of a magnetic resonance (MR) imaging, computed tomographic (CT), helical CT, x-ray, positron emission tomographic, fluoroscopic, ultrasound and single photon emission computed tomographic (SPECT) technique. Other types of modalities may also be used to acquire the images. The images may be binary (e.g., black and white) or grayscale. In addition, the images may comprise two dimensions, three dimensions or any other number of dimensions. Further, the images may comprise medical images of an anatomical part (e.g., breast, colon, lung).

The images may be pre-processed, either automatically by the computer system 101, manually by a skilled user (e.g., radiologist), or a combination thereof. Various types of pre-processing may be performed. In one implementation, the images are pre-filtered and contrast-enhanced by injecting a contrast agent (CA) into a patient. The images may comprise Dynamic Contrast-Enhanced MR images obtained by measuring CA concentration in lesions over time.

Pre-processing the images may also include segmenting the images to delineate regions of interest (ROIs). An ROI refers to a volume or area (e.g., central slice of the volume) identified for further study and processing. In particular, an ROI may be associated with an abnormal medical condition. For example, the ROI may represent a potentially malignant lesion, tumor or mass in the patient's body. In one implementation, ROIs are automatically detected by the computer system 101 using a computer-aided detection technique, such as one that detects points where the increase in voxel intensity is above a certain threshold. Alternatively, ROIs may be identified manually by, for example, a skilled user via a user-interface at the radiologist workstation 103.

The image data may further include at least first and second descriptors describing portions of the image data. The portions of image data may correspond to the ROIs identified during segmentation. In one implementation, the first and second descriptors are selected from a standard set of descriptors based on a classification system. Each descriptor may be associated with a certain physical characteristic, such as a morphological or enhancement characteristic. The image data may be described manually by a radiologist or any other skilled user using the descriptors. For example, a radiologist may label the image data via a user interface provided at the radiologist workstation 103.

Various types of classification systems may be used for different applications. One such classification system is developed by the American College of Radiology (ACR) for use with the Breast Imaging Reporting and Data systems (BI-RADS). Other types of classification systems, such as the Bethesda System for Reporting Cervical/Vaginal Cytologic Diagnoses, may also be used for different applications. In one implementation, the classification system provides a standard lexicon or set of descriptors for use in reporting various conditions. For example, BI-RADS provides a standard set of descriptors for describing lesion architecture and enhancement characteristics of breast MR images.

Figure 3:
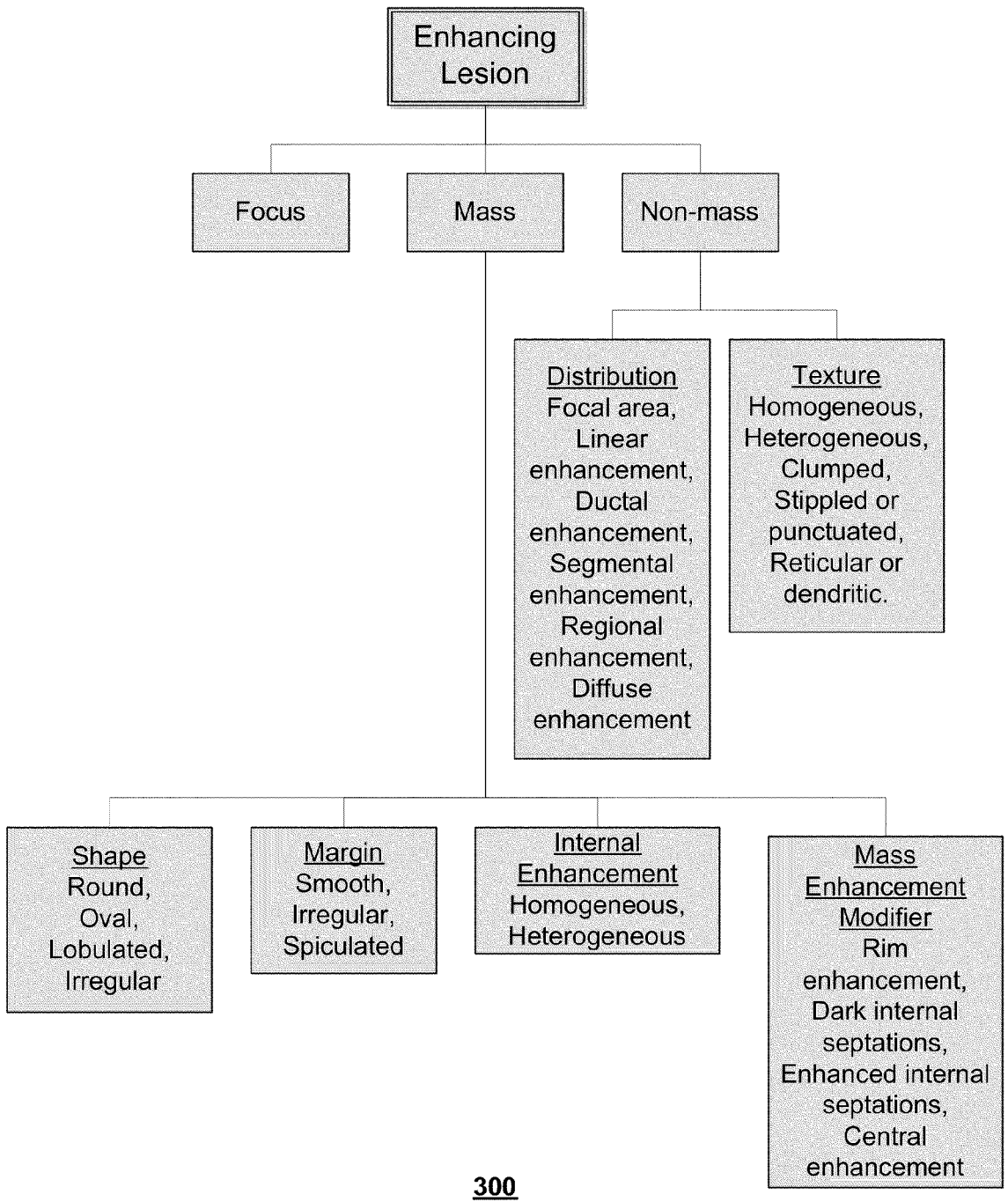
FIG. 3 shows the BI-RADS classification system for describing an enhancing lesion.

FIG. 3 illustrates the BI-RADS classification system 300 for describing an enhancing lesion. According to the BI-RADS classification system, enhancement lesions may be divided into three main categories: focus, mass and non-mass enhancement. A focus is an enhancement measuring less than 5 mm. A mass is a 3D lesion that occupies a space within the breast. A non-mass is an area of enhancement that does not belong to a 3D mass or have distinct mass characteristics. Characteristics for a mass may be sub-divided into 4 sub-categories: shape, margin, internal enhancement and modifier. The shape of a mass may be described as round, oval, lobulated or irregular, while the margin may be described as smooth, irregular or speculated. The internal enhancement of a mass may be described as homogeneous or heterogeneous, while the modifier of a mass may be described as rim enhancement, dark internal septations, enhanced internal septations or central enhancement. Characteristics for a non-mass may be divided into 2 sub-categories: distribution and texture. The distribution of a non-mass may be described as focal area, linear enhancement, ductal enhancement, segmental enhancement, regional enhancement, or diffuse enhancement. Texture of a non-mass may be described as homogeneous, heterogeneous, clumped, stippled or punctuated, reticular or dendritic.

Referring back to FIG. 2, at 206, the computer system 101 processes the image data to generate at least one conditional probability of observing the first descriptor in the image data given an occurrence of the second descriptor. Generally, a conditional probability (P(A|B)) refers to the probability of some random event A, given the knowledge that a related event B occurred (i.e. posterior). An "event" as used herein refers to the occurrence of a descriptor. A descriptor "occurs" when a characteristic defined by the descriptor is known to be present in a portion of the image data. For example, a lesion corresponding to a portion of the image data may be categorized according to shape and margin. Descriptors for the lesion may include "round shape" and "speculated margin," depending on the characteristics present in the lesion. The probability of the lesion having a speculated margin given a round shape is denoted by P (speculated margin|round shape). Similarly, the probability of the lesion having a dark septation given a round shape is denoted by P (dark septation|round shape). Any other combinations of categories (e.g., shape, mass enhancement modifier, internal enhancement, etc.) and corresponding descriptors (e.g., round, dark internal septation, homogenous etc.) may also be used.

The conditional probabilities may serve to coordinate descriptors within or across categories of the classification system. Such coordination advantageously avoids the confusion that may be caused by using contradictory descriptions. For example, if the conditional probability of a lesion having a speculated margin given a round shape (P (speculated margin|round shape)) is low, such as in a lipid, the classification result may be suppressed such that the lesion is more likely to be classified as having a round shape and not a speculated margin. In another example, if the conditional probability P (dark septations|rim enhancement) is very low, such as in a cancer, a lesion with rim enhancement and dark septations may be more likely to be classified as one with rim enhancement (indicative of malignancy). However, such coordination should not cover up clear evidence of the characteristic being present. For example, clear speculation should not be suppressed even when the lesion is round. This may be achieved by, for example, leaving some possibility for a lesion to be classified as "speculated," while increasing the threshold for classifying the lesion as "round."

The conditional probability P(A|B) of observing a first descriptor (A) in the image data given an occurrence of a second descriptor (B) is denoted by the following equation (1):

$$P(A\mid B) = \frac{P(A \cap B)}{P(B)} \quad (1)$$

In one implementation, the conditional probability P(A|B) is obtained empirically by counting the number of occurrences of descriptors (A, B) in the image data. Specifically, the conditional probability P(A|B) may be determined by dividing the total number of occurrences of both descriptors A and B by the number of occurrences of descriptor B in the image data. For example, in a ground truth dataset of 59 patients, where 7 lesions are clinically described as having a "speculated margin" and no lesions are described as having a "round shape," the conditional probability P (round shape|speculated margin) is 0. In the case where P (B)=0, resulting in P (A|B) being undefined, the decision thresholds of classification for descriptors A and B are not modified by the conditional probability P (A|B).

The number of image samples in the image data is preferably large enough to represent the statistical variation of characteristics, such that conditional probabilities of the desired combinations of descriptors may be estimated. For example, 120 image samples may be adequate to statistically measure the conditional probabilities of 4 combinations of descriptors when the combinations are approximately equally likely. In addition, the image samples are preferably taken of patients with demographics (e.g., age, gender) representative of the target test cases that the trained classifier will be applied to.

The number of combinations of descriptors (A, B) may grow exponentially with the complexity of the framework. For example, based on the BI-RADS lexicon for a mass lesion, the shape category has 4 descriptors, the margin category has 3 descriptors, the internal enhancement category has 2 descriptors and the 4 modifier sub-categories have 2 descriptors each. The total number of possible different combinations may be $4 \times 3 \times 2 \times 2^4 = 384$. Though it is possible to count all the numbers of occurrences to fill out a table of 384 different combinations to explicitly represent the domain knowledge, the problem may be simplified by assuming acyclic dependencies among the descriptors and removing values which are unavailable or meaningless. The reduction of the size of the table advantageously reduces the time, effort, and memory storage required to create and maintain the table, and enhances statistical robustness by having more sample data for each combination.

In accordance with one implementation, a probabilistic technique is used to reduce the number of combinations of descriptors. The probabilistic technique may comprise a Bayesian network-based technique. Other types of probabilistic models, such as belief propagation, loopy belief propagation at the presence of cycles in the networks, causal probabilistic network, directed acyclic graphical model, or Bayesian belief network, may also be used. A Bayesian network is generally a probabilistic graphical model that represents a set of random variables and their conditional independencies via a directed acyclic graph. In particular, the goal of the Bayesian network is to reduce the number of combinations of joint probabilities.

Figure 4:
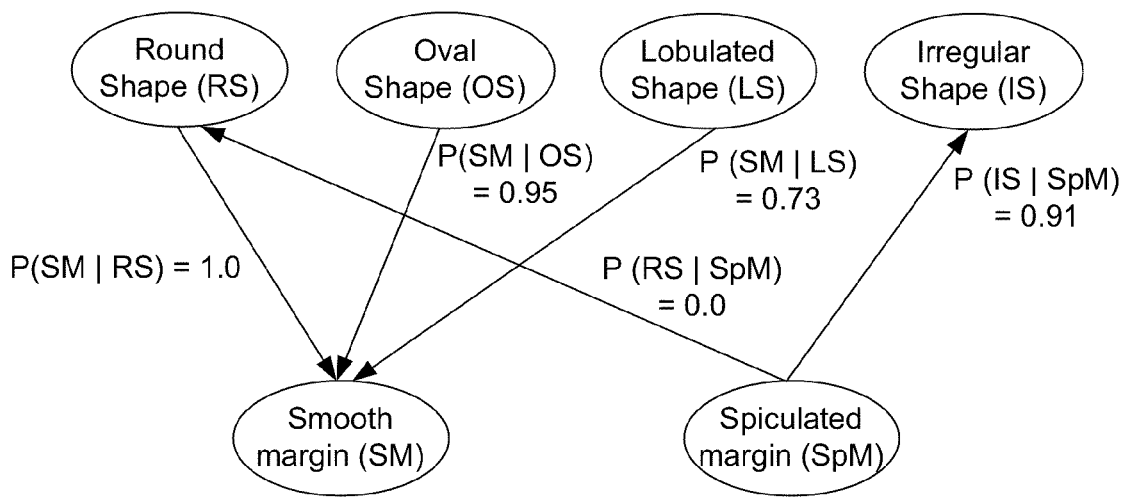
FIG. 4 shows an exemplary Bayesian network diagram.

FIG. 4 shows a diagram of an exemplary Bayesian network-based formulation of the present description problem. The exemplary Bayesian network 400 can be represented as a directed graph embodying the concept of determining conditional probabilities, as described above. The nodes of the graph represent descriptors (i.e. random variables), and the arcs represent dependence relations among the descriptors.

Bayesian networks have built-in independence assumptions, which reduce the number of conditional probabilities needed. Each node is conditionally independent of any subset of nodes that are not its descendants, given its parent nodes. In addition, by using expert knowledge, combinations of descriptors that are independent of each other may be identified and eliminated, thereby further reducing computational requirements. For example, in FIG. 4, the descriptors "lobulated shape" (LS) and "speculated margin" (SpM) are assumed to be independent of each other, and thus conditional probabilities P (LS|SpM) and P (SpM|LS) need not be computed. Information about the values of some variables may also be used to obtain probabilities for the values of others, thereby further enhancing computational efficiency.

At 208, the computer system 101 trains at least one classifier using the one or more estimated conditional probabilities. Various machine learning techniques, such as support vector machines (SVM), neural networks, linear or quadratic discriminant analysis, may be used to train the classifier. During training, features extracted from a test data set are provided as input to the classifier. The classifier may be trained to discriminate between one or more categories. For example, the classifier may be used to recognize an ROI based on its shape, margin or enhancement. As discussed previously, a lesion with an irregular margin or shape is more likely to be malignant than a lesion with a smooth margin or round (or oval) shape. Therefore, the classifier may be adapted to indicate a likelihood of malignancy based on the morphological property of the lesion. Other types of classifiers are also useful.

The conditional probabilities may be incorporated into the training process by adjusting training parameters accordingly. In one implementation, the sensitivity of the classifier is adjusted by tuning decision threshold values using the conditional probabilities. For example, if P (speculated margin|round shape) is very low, the decision threshold for "speculated margin" classification may be increased such that it is unlikely to be classified by the classifier as having a speculated margin when it is known to have a round shape. This may be achieved by, for example, dividing the decision threshold value by the conditional probability P (speculated margin|round shape).

In one implementation, the value of the decision threshold is further tuned by an optimization technique. Statistical algorithms such as maximum likelihood, expectation maximization (EM) or belief propagation may be used to optimize the decision threshold value. Other optimization techniques may also be used. After the classifier is trained based on the decision threshold values, it may be applied to test input images to automatically classify ROIs. The classification results may be used to, for example, aid in the detection, diagnosis and treatment of medical conditions.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of image analysis, comprising:
   (a) receiving, by a computer system, image data including at least first and second descriptors describing portions of the image data;
   (b) processing, by the computer system, the image data to generate at least one conditional probability of observing the first descriptor in the image data given an occurrence of the second descriptor so as to coordinate the first and second descriptors; and
   (c) training, by the computer system, at least one classifier based on the conditional probability, wherein the conditional probability is used to suppress results generated by the classifier to minimize contradiction.

2. The method of claim 1 further comprising:
   (d) acquiring, by an imaging device, the image data by one of a magnetic resonance (MR) imaging, computed tomographic (CT), helical CT, x-ray, positron emission tomographic, fluoroscopic, ultrasound and single photon emission computed tomographic (SPECT) technique.

3. The method of claim 1 wherein the image data comprises at least one image of an anatomical part.

4. The method of claim 1 wherein the first and second descriptors are associated with morphological or enhancement characteristics of a lesion.

5. The method of claim 1 further comprising:
   (e) selecting the first and second descriptors from a standard set of descriptors based on a classification system.

6. The method of claim 5 wherein the classification system comprises Breast Imaging Reporting and Data System (BI-RADS).

7. The method of claim 1 wherein the step (b) comprises empirically determining the conditional probability by counting number of occurrences of the first and second descriptors in the image data.

8. The method of claim 7 wherein the step (b) comprises dividing a total number of occurrences of the first and second descriptors in the image data by a number of occurrences of the second descriptor in the image data.

9. The method of claim 1 wherein the step (b) comprises determining, by the computer system, a plurality of conditional probabilities of different combinations of the first and second descriptors.

10. The method of claim 9 further comprising performing a probabilistic technique to reduce number of different combinations of the first and second descriptors.

11. The method of claim 10 wherein the probabilistic technique comprises a Bayesian network-based technique.

12. The method of claim 10 wherein the probabilistic technique comprises a belief propagation-based technique.

13. The method of claim 1 wherein step (c) comprises tuning at least one decision threshold value using the conditional probability.

14. The method of claim 13 further comprising optimizing the decision threshold value using a statistical technique.

15. The method of claim 14 wherein the statistical technique comprises expectation maximization (EM).

16. A non-transitory computer usable medium having a computer readable program code tangibly embodied therein, said computer readable program code adapted to be executed by a processor to implement a method of image analysis, comprising:
   (a) receiving image data including at least first and second descriptors describing portions of the image data;
   (b) processing the image data to generate at least one conditional probability of observing the first descriptor in the image data given an occurrence of the second descriptor so as to coordinate the first and second descriptors; and
   (c) training at least one classifier based on the conditional probability, wherein the conditional probability is used to suppress results generated by the classifier to minimize contradiction.

17. The non-transitory computer usable medium of claim 16 wherein the method of image analysis further comprises:

(d) selecting the first and second descriptors from a standard set of descriptors based on a classification system.

18. The non-transitory computer usable medium of claim 17 wherein the classification system comprises Breast Imaging Reporting and Data System (BI-RADS).

19. An image analysis system, comprising:

a memory device for storing computer readable program code; and a processor in communication with the memory device, the processor being operative with the computer readable program code to:

(a) receive image data including at least first and second descriptors describing portions of the image data;

(b) process the image data to generate at least one conditional probability of observing the first descriptor in the image data given an occurrence of the second descriptor so as to coordinate the first and second descriptors; and (c) train at least one classifier based on the conditional probability, wherein the conditional probability is used to suppress results generated by the classifier to minimize contradiction.

20. The system of claim 19 wherein the image data comprises at least one dynamic contrast-enhanced MR image.

* * * * *